United States Patent [19]

Hillinger

[11] Patent Number: 4,606,959
[45] Date of Patent: Aug. 19, 1986

[54] HONEYCOMB PANEL

[76] Inventor: Brad O. Hillinger, 216 - 36th Pl., Manhattan Beach, Calif. 90266

[21] Appl. No.: 727,289

[22] Filed: Apr. 25, 1985

[51] Int. Cl.$^4$ .............................................. B32B 3/12
[52] U.S. Cl. ...................................... 428/116; 52/806; 428/118
[58] Field of Search ................... 428/116, 118; 52/806

[56] References Cited

U.S. PATENT DOCUMENTS

| | | | |
|---|---|---|---|
| 3,224,924 | 12/1965 | Von Ardenne et al. | 428/117 |
| 3,391,056 | 7/1968 | Robinson, Jr. | 428/116 X |
| 3,753,843 | 8/1973 | Hutchison | 428/73 X |
| 4,083,159 | 4/1978 | Hatch et al. | 428/116 X |
| 4,194,313 | 3/1980 | Downing | 428/116 X |
| 4,353,947 | 10/1982 | Northcutt | 428/116 |
| 4,382,106 | 5/1983 | Royster | 428/116 X |
| 4,461,796 | 7/1984 | Fukahori et al. | 428/116 |
| 4,465,725 | 8/1984 | Riel | 428/116 |

OTHER PUBLICATIONS

*Product Bulletin Data Sheet* 109—"Protective Inner Packaging", published by Honeycomb Structural Products, Inc., La Mirada, CA (2 pages).
*Product Bulletin Data Sheet* 111—"Kraft Paper Honeycomb", published by Honeycomb Structural Products, Inc., La Mirada, CA (2 pages).
Data Sheet—"Permaprint", IP-2000 Series, published by MacTac, Stow, Ohio, Jan. 1985, (1 page).

*Primary Examiner*—Henry F. Epstein
*Attorney, Agent, or Firm*—Oldham, Oldham & Weber Co.

[57] ABSTRACT

Rigid lightweight composite panel. The panel comprises a honeycomb core with thin imperforate facing sheets bonded thereto, and sheets of lightweight polyvinyl chloride (PVC) having a foamed center and smooth matte surfaces. The PVC sheets are bonded to the facing sheet by thin layers of pressure sensitive adhesive material which is adhesive on both sides. The panels are useful as custom exhibits and for other purposes.

4 Claims, 5 Drawing Figures

HONEYCOMB PANEL

TECHNICAL FIELD

This invention relates to exhibits of the type used by exhibitors at trade shows, exhibitions and conventions to advertise and promote their goods or services. More particularly, this invention relates to custom exhibits.

BACKGROUND ART

There are two basic types of exhibits offered in the marketplace.

The first is a standard prefabricated portable component system. This type of system is normally used in small booth spaces. Portable systems are easily set up and dismantled and offer a wide variety of configurations and applications. They are also utilized in sales seminars, recruitment programs, and lobby displays. There are several manufacturers of portables in the marketplace. The first time exhibitor will normally use a portable or low-end system to accent his/her presentation at a trade show.

The second type of exhibit is referred to as a custom exhibit. The custom trade show exhibits can range from a simple 10 foot×10 foot booth space to a large two-story 100 foot×100 foot structure. The custom display will normally travel around the country, hence shipping becomes a factor in cost and design. A custom exhibit requires labor to set up and dismantle and it also requires storage arrangements. Custom exhibits are designed by either advertising departments within companies, ad agencies, exhibit design firms, or exhibit manufacturers.

Portable exhibits are light in weight and are easily moved from place to place. They will not support heavy loads, however. Panels having honeycomb cores have been used as portable exhibits. U.S. Pat. No. 4,194,313 to Downing illustrates an exhibit of this type.

Custom exhibits are much more sturdy and will support heavy loads. Such exhibits are used, for example, whenever heavy loads are to be mounted on vertical exhibit walls. Wood construction continues to dominate the custom exhibit field. Such construction typically includes wood framing, plywood sheeting and decorative materials which cover the framing and sheeting. Such exhibits are heavy and costly to build and to move from place to place.

There is a need for an exhibit having the sturdiness of custom exhibits presently available and the light weight, portability and ease of assembly and disassembly which characterize standard or portable exhibits.

DISCLOSURE OF THE INVENTION

It is an object of this invention to provide a composite structure which is light in weight and yet strong, and which is capable of being formed into free-standing shapes.

Another object of this invention is to provide a light-weight exhibit which is resistant to both fire and chemicals.

Another object of this invention is to provide a structure which can be readily formed into desired shapes without returning to its original shape.

Another object of this invention is to provide a composite structure which is particularly useful as an exhibit or display panel, for example for trade shows.

These and other objects are realized according to this invention by a novel composite structure which comprises a multicellular core comprising a plurality of transversely extending open ended cells, thin imperforate facing sheets closing the open ends of the cells, a pressure sensitive layer which is pressure sensitive on both sides, and a rigid light-weight plastic layer having a foamed center and a smooth thin skin on either side of the center.

The composite structures of this invention are particularly useful as custom exhibits. They are preferably made in the form of wall sections or panels for this purpose. Composite structures of this invention which are intended for other purposes may also be made in the form of panels.

BRIEF DESCRIPTION OF DRAWINGS

Figure 1:
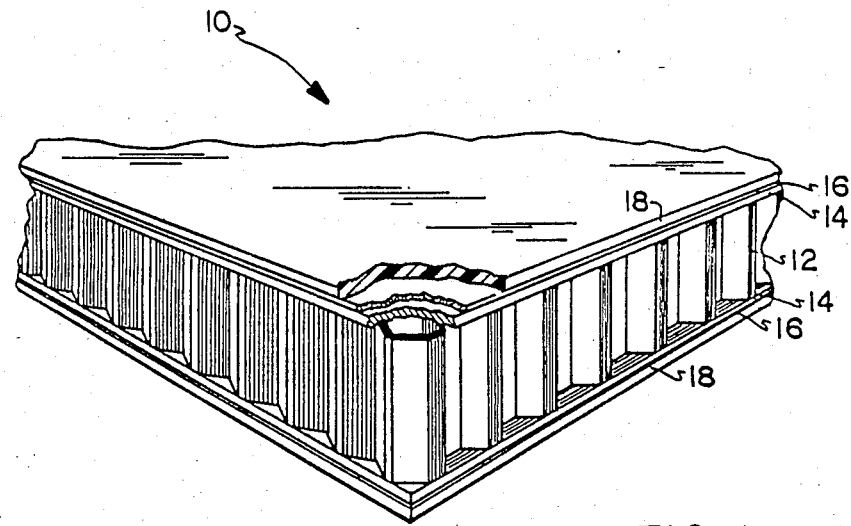

IN THE DRAWINGS:

FIG. 1 is a perspective view of a panel according to this invention, with parts cut away.

Figure 2:
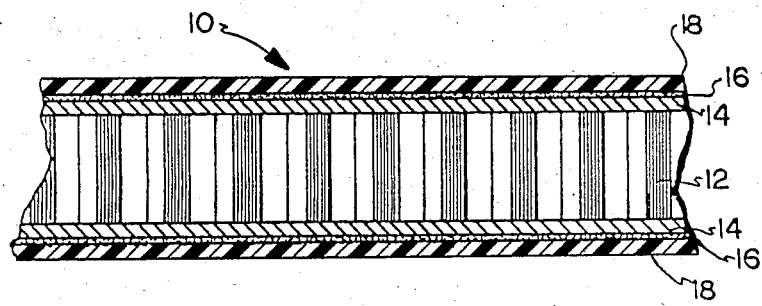

FIG. 2 is a cross-sectional view of a panel according to this invention.

Figure 3:
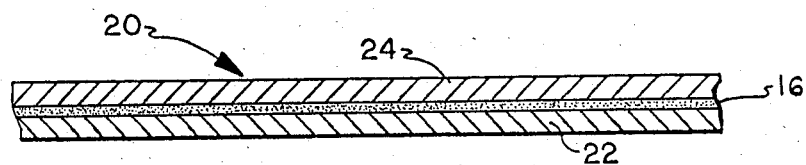

FIG. 3 is a cross-sectional view of a pressure sensitive laminate which is useful in making the panels of this invention.

Figure 4:
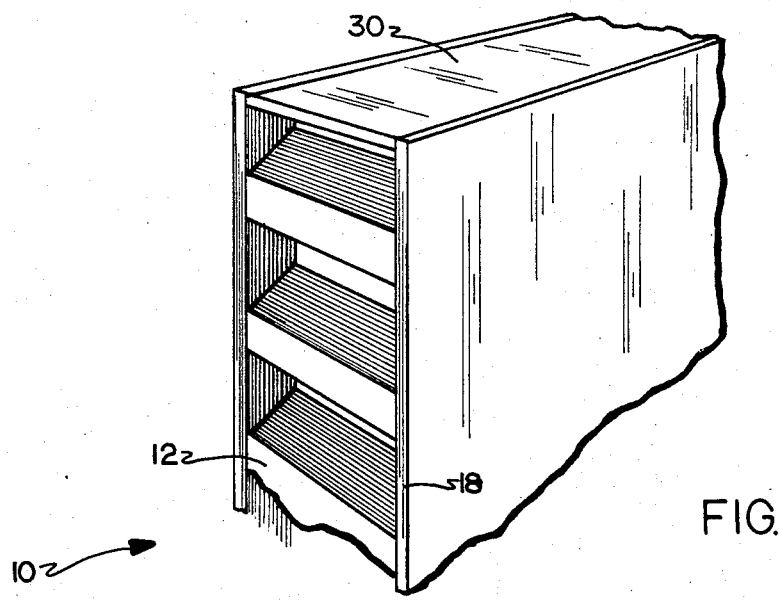
Figure 5:
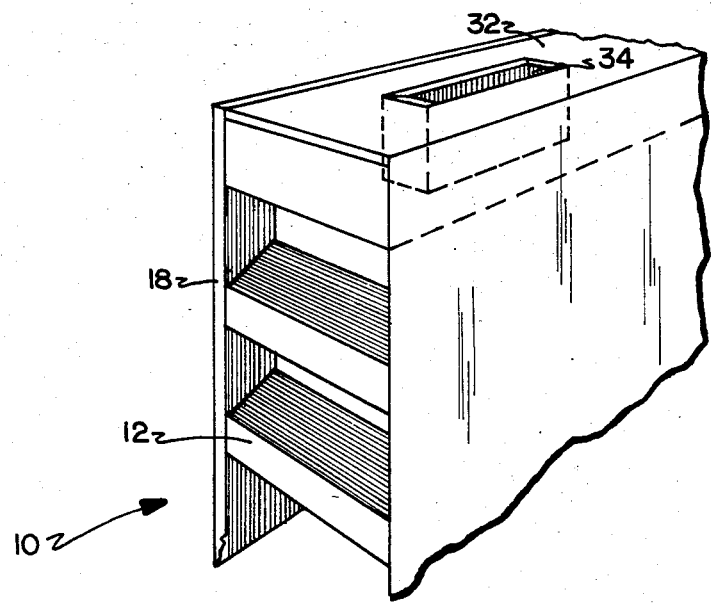

FIGS. 4 and 5 are perspective fragmentary views of panels according to this invention showing useful edge closures therefor.

BEST MODE FOR CARRYING OUT THE INVENTION

Referring now to FIGS. 1 and 2, 10 indicates generally a rigid light-weight honeycomb panel according to this invention. The panel 10 comprises a multicellular core such as a honeycomb core 12 having multiplicity of transversely extending open-ended cells, thin imperforate facing sheets 14 which close the open ends of the cells honeycomb core 12, thin layers 16 of pressure sensitive adhesive material which is adhesive on both sides, and layers 18 of a rigid light-weight plastic sheet material. The rigid light-weight plastic layers 18 form the outer layers of the panel for a variety of purposes. However, it is to be understood that additional layers can be laminated to these plastic layers by techniques to be described hereafter. Panels of this invention will also typically have edge closure strips, not shown in FIG. 1, to protect the honeycomb core 12; these have been omitted for the sake of clarity.

The preferred multicellular core 12 is a conventional honeycomb structure comprising a plurality of open-ended cells formed by cell walls which extend transversely, i.e. in the thickness direction of the composite structure. The cells are typically hexagonal in cross-sectional shape. The ends of these cells lie in parallel planes. The honeycomb core may be of any desired thickness, which will depend to some extent on the desired use for the finished structure. For custom exhibits the thickness of the honeycomb core 12 is typically from about 1 inch to about 4 inches. The standard thickness for this purpose is 1½ inches. The honeycomb core may be made of known materials, such as kraft paper which has been impregnated to improve its strength and fire retardancy.

A corrugated core having a plurality of open-ended transversely extending cells may replace the honeycomb core 12 if desired. Such corrugated cores may be made from conventional materials, such as corrugated paperboard or cardboard.

Two thin imperforate facing sheets 14 enclose the ends of the cells of honeycomb core 12. These sheets may be made of known material, e.g. kraft paper or paperboard, which has preferably been impregnated for improved strength and fire retardancy.

Honeycomb core assemblies comprising a honeycomb core 12 and two facing sheets 14 are normally manufactured and sold as a unit. Such units are described, for example, in U.S. Pat. No. 4,382,106 to Royster and in Product Bulletin Data Sheets 109 and 111, subtitled "Protective Inner Packaging" and "Kraft Paper Honeycomb", respectively, published by Honeycomb Structural Products, Inc., La Mirada, Calif.

Foamed plastics have been tried as core materials and found unsatisfactory. Foamed plastics have "memory", that is, they will return to their original shape when bent. An important characteristic of the structure of this invention is that they can be formed into desired shapes and will retain these shapes. The core therefore must not have "memory". The aforedescribed honeycomb cores do not have "memory" and are well suited to the purposes of this invention.

The pressure sensitive adhesive layer 16 is a very thin layer of material which is aggressively adhesive on both sides. The preferred material is a free film adhesive. The thickness of this film is typically about 0.0018 inch (0.05 mm) although it may be thicker or thinner. The thickness of this film has been greatly exaggerated in the drawing for the sake of clarity. Alternatively, an adhesive construction comprising a thin non-adhesive plastic film which is coated on both sides with pressure sensitive adhesive material can be used if desired. In either case, the adhesive must be capable of bonding to the sheet 18 of foamed plastic material as well as to the facing sheets 14. The preferred material for sheets 18 is a smooth surface, light weight moderately expanded polyvinyl chloride (PVC) as will be hereinafter described. Many adhesives will not bond satisfactorily to such material. Also, the adhesive must be capable of being applied at normal ambient temperatures (i.e. about 20°–25° C. or 68°–77° F.) and yet be able to withstand temperatures which the composite structures of this invention may encounter in storage and use, i.e. up to about 140° F. (60° C.)

The preferred adhesive for use in the present invention is a free film, acrylic-vinyl acetate copolymer to which a small amount of a tackifying resin has been added to improve adhesion. The acrylic monomer component of the copolymer is typically butyl acrylate, 2-ethlyhexyl acrylate, or a mixture of the two. Suitable adhesive materials and their preparation are known in the art and will therefore not be described in further detail. Suitable adhesive products having a free film pressure sensitive adhesive as above described are commercially available; they are sold, for example, under the name PERMAPRINT IP-2000 by MACtac, Stow, Ohio.

It is important to use a pressure sensitive adhesive to bond plastic sheets 18 to the facing sheets 14. Other types of adhesive have not been satisfactory. For example, water soluble adhesives cannot be used on kraft paper facing sheets without causing warpage, and will not adhere to polyvinyl chloride and other plastic materials. Hot melt adhesives are not suitable because the elevated temperatures required for their application will cause the polyvinyl chloride sheet 18 to soften and warp. Contact adhesives also are not suitable. Pressure sensitive adhesives of the type above described, on the other hand, can be applied at ambient temperatures, will aggressively adhere to both the facing sheets and the plastic sheet 18, and will not cause damage to either.

The outer layer 18 is a rigid lightweight plastic material. By far the best material known to applicant is a rigid, moderately expanded polyvinyl chloride (PVC) sheet having a foamed center and a thin skin having a smooth matte outer surface on either side. Such a material is sold under the trademark SINTRA by Alusuisse Metals, Inc. of Fair Lawn, N.J. This PVC sheet may be produced by continuous extrusion. Its density is about one-half that of a "solid" PVC sheet produced by conventional methods. The material is resistant to fire and to most chemicals. The surface can be painted. In addition, the material has high impact strength. The material can be heat bent, which permits panels according to this invention to be bent into desired shapes. Sheets 18 may be comparatively thin. For example, a sheet about 2 to 3 millimeters (approximately 0.08 to 0.12 inch) thick in a composite structure of this invention having an overall thickhess of about 1.5 to 2 inches is sufficient to give the overall required strength and rigidity to the composite structure. Sheet 18 may be thicker or thinner as required.

Other plastic sheet materials, e.g., acrylonitrile-butadiene-styrene (ABS), an acrylic sheet, have been tried without success.

It is very important to use a rigid light-weight plastic material as above described as the material for outer sheets 18. Use of this material in conjunction with a honeycomb core 12 and facing sheets 14 as above described gives a structure having the structural strength of custom exhibits with the light weight, portability and ease of assembly associated only with standard or portable exhibits heretofore. This combination of properties is just simply not obtained if another material is used instead of moderately expanded rigid PVC as the outer layer 18, according to applicant's findings.

The composite structures of this invention are preferably made in the form of wall sections or panels. A convenient wall section size for custom exhibits is 4 feet×4 feet×1½ inches. These dimensions can be varied, for example, the thickness may be greater or less, e.g., from about 1 inch to about 4 inches. Panels for different purposes may have different dimensions as required for the intended use.

Free film adhesive 16 is generally used in the form of an adhesive laminate as shown in FIG. 3. Referring now to FIG. 3, a typical pressure sensitive adhesive product or laminate 20 comprises a free film 16 of pressure sensitive adhesive material which is adhesive on both sides, a first release liner 22, and a second release liner 24. The inner surfaces of both release liners (i.e. the surfaces in contact with the free film adhesive 16) are coated with very thin release coatings (not shown), which are typically silicones. Different silicones are typically used so that first release liner 22 will release before the second release liner 24. The two release liners may be made of the same or different materials; in a preferred adhesive product, the first release liner 22 is made of paper and the second release liner 24 is a thin film of polyethylene. The preferred free film adhesive material 16 is a thin film of acrylic-vinyl acetate copolymer as explained previously. The laminate 20 is ordinarily supplied in roll form. A preferred adhesive product of this type, as explained previously, is PERMAPRINT IP-2000, which is made and sold by MACtac, Stow, Ohio.

To form a panel according to this invention, the first release liner 22 is peeled off leaving one surface of the pressure sensitive adhesive film 16 exposed. This exposed surface is then placed on the outer surface of a facing sheet 14 and pressure is applied. Pressure sensitive adhesive may be applied to the outer surface of facing sheets 14 either one at a time or simultaneously. Methods and machinery for applying pressure sensitive layers are known in the art. Next, a second release liner 24 is peeled off and a PVC sheet 18 is applied to the pressure sensitive film 16 thus exposed. This also can be done using methods and machinery known in the art. The two sheets 18 can be applied either one at a time or simultaneously.

The order of assembly can be changed if desired, thus, one may apply the adhesive layer 16 to PVC sheet 18 first, then apply the adhesive-coated sheet to the outer surfaces of facing sheets 14.

It is necessary, or at least highly desirable for most purposes, to provide edge closures in order to protect the honeycomb core 12. Provision of these edge closures will now be described with reference to FIGS. 4 and 5.

Referring to FIG. 4, there is shown a honeycomb panel according to this invention which has thin edge closure strips 30 in addition to the structure described with reference to FIGS. 1 and 2. The edge closure strips 32 in the embodiment of FIG. 5 are substantially thicker than those in FIG. 4 and the side edge strips may include holes 34 for locking members (not shown) which permit coupling of one panel to another.

A variety of hard materials, such as wood, metal (e.g., aluminum), rigid plastics, and particle board, may be used as edge closure strip materials. A preferred wood is Douglas fir. Among the suitable plastic materials are both conventional rigid PVC and moderately expanded PVC like that used as the outer surfaces 18. Two specially preferred materials are Douglas fir and moderately expanded PVC. The preferred techniques for applying these materials differ as will now be explained.

Referring to FIG. 5, Douglas fir is applied as one edge closure material 32 before the outer surface sheet 18 is applied. The closure member is applied to the subassembly of honeycomb core 12 and facing sheets 14; this may be done by conventional means. Then the surface layers 18 are applied as previously described.

When the material for edge strips 30 (FIG. 4) or 32 (FIG. 5) is moderately expanded PVC, the entire structure as shown in FIGS. 1 and 2, including the outer sheets 18, is formed first, then the edge strips are inserted in place so that the outside surfaces of the edge strips are flush with the edges of sheets 18 as shown in FIGS. 4 and 5. Finally, the adjacent portions of sheets 18 and strips 30 or 32 are welded together; this may be done by known PVC pipe welding techniques.

Composite structures having more layers than those shown in FIGS. 1 and 2 may be formed. For example, thin vinyl sheets may be placed on the outer surface of PVC sheets 18. A pressure sensitive adhesive layer similar to those previously described is applied to the outer surface of each of the two sheets 18, then the desired outer surface layer is applied to the pressure sensitive adhesive.

Lamination techniques for making panels of this invention may be similar to those used for mounting photoprints on substrates. Suitable techniques and apparatus for making these panels are known in the art.

Honeycomb panels according to this invention are useful for a variety of purposes, including custom exhibits, graphic panels (e.g. for photo mounting), office partitions, room partitions, shelving, desks, chairs and three-dimensional outdoor lettering, for example. The combination of high strength and light weight is valuable in all of these applications.

Panels of this invention are especially useful as exhibits, particularly of the type used in trade shows. Panels of this invention are free standing. They can be used over and over again, and have a far longer life than panels now in use. Panels of this invention can be assembled and disassembled much more rapidly than presently known panels. They have high impact strength, and are not easily destroyed or damaged except by intentional hammer blows. These panels can be bent to desired shape and will retain the shape to which they are bent. The surfaces are easily painted. Finally, they are light in weight, so that they can be moved about easily from place to place.

While in accordance with the patent statutes, a preferred embodiment and best mode has been presented, the scope of the invention is not limited thereto, but rather is measured by the scope of the attached claims.

What is claimed is:

1. A rigid lightweight composite structure comprising:
    a multicellular core comprising a plurality of transversely extending open-ended cells;
    thin imperforate facing sheets closing the open end of said cells;
    a thin pressure sensitive adhesive layer on the outer surface of each of said facing sheets, said layer being pressure sensitive on both sides, and
    a pair of rigid lightweight polyvinyl chloride sheets, each having a foamed center and a smooth thin skin on either side of said center.

2. A structure according to claim 1 in which the core is a honeycomb core.

3. A composite structure according to claim 1 in which said rigid lightweight polyvinyl chloride sheets are applied directly to the respective adjacent pressure sensitive adhesive layers.

4. A structure according to claim 1, said structure being in the form of a panel.

* * * * *